United States Patent
Xia et al.

(10) Patent No.: US 11,698,505 B2
(45) Date of Patent: Jul. 11, 2023

(54) SYSTEMS AND METHODS FOR IDENTIFYING DEPLOYED FIBER CABLES IN REAL-TIME

(71) Applicant: Verizon Patent and Licensing Inc., Basking Ridge, NJ (US)

(72) Inventors: Tiejun J. Xia, Richardson, TX (US); Glenn A. Wellbrock, Wichita, KS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 94 days.

(21) Appl. No.: 17/447,871

(22) Filed: Sep. 16, 2021

(65) Prior Publication Data

US 2023/0083644 A1   Mar. 16, 2023

(51) Int. Cl.
  *G02B 6/44* (2006.01)
  *G01V 1/34* (2006.01)
  *G01V 1/00* (2006.01)
  *G01V 1/18* (2006.01)

(52) U.S. Cl.
  CPC ............ *G02B 6/447* (2013.01); *G01V 1/001* (2013.01); *G01V 1/18* (2013.01); *G01V 1/34* (2013.01)

(58) Field of Classification Search
  CPC ............................... G02B 6/447; G01V 1/001
  See application file for complete search history.

(56) References Cited

U.S. PATENT DOCUMENTS

2020/0370970 A1*  11/2020  Huang ............... G01K 11/3206

\* cited by examiner

*Primary Examiner* — Sung H Pak
*Assistant Examiner* — Hoang Q Tran

(57) ABSTRACT

A device may provide, to a user device, a first message instructing a technician to move fiber cables and may receive a first signal based on the technician moving the fiber cables and a rest signal based on the technician stopping movement of the fiber cables. The device may calculate a distance, an average peak signal, and a baseline signal based on the first signal and the rest signal and may calculate a data collection window based on the distance, the average peak signal, and the baseline signal. The device may provide, to the user device, a second message instructing the technician to move one fiber cable at a time and may receive second signals based on the technician moving one fiber cable at a time. The device may provide, for display to the user device, the data collection window and indications of the second signals.

20 Claims, 12 Drawing Sheets

100 ⟶

140
Provide, to the user device, a second message instructing the technician to move one fiber cable at a time 150
Provide, to the user device, the data collection window and indications of the one or more second signals, within the window, until the target fiber cable is identified Fiber sensing device 105

Target fiber cable

User device 110

Technician

Cables

Fiber cables

Field location

145
Receive one or more second signals based on the technician moving one fiber cable at a time

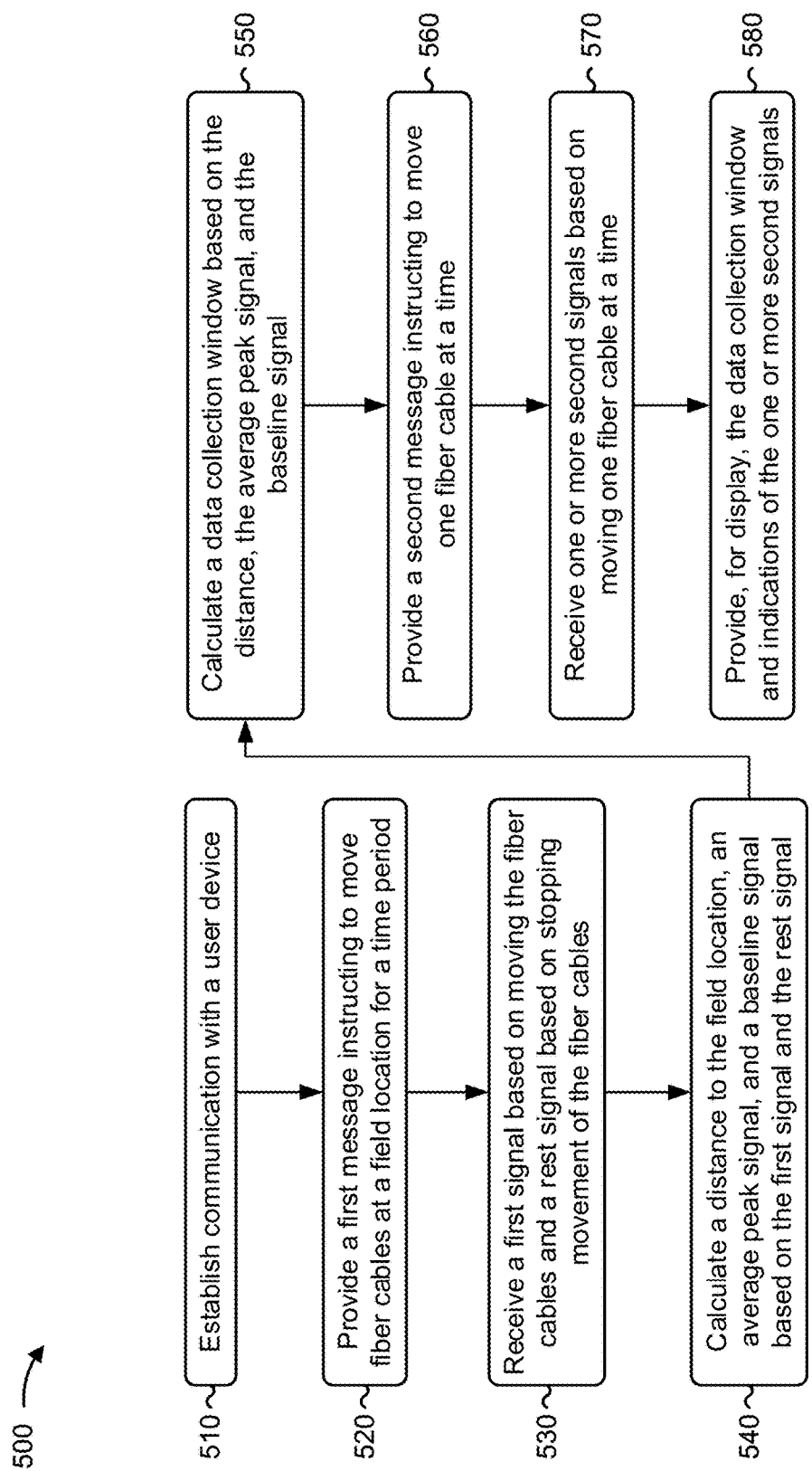

SYSTEMS AND METHODS FOR IDENTIFYING DEPLOYED FIBER CABLES IN REAL-TIME

BACKGROUND

To maintain an integrity of deployed fiber cables, network service providers need to perform maintenance on fiber cables at locations in the field. When a deployed fiber cable needs maintenance, a technician may be deployed to correct the issue.

BRIEF DESCRIPTION OF THE DRAWINGS

FIG. 5 is a flow chart of an example process for identifying deployed fiber cables in real-time.

DETAILED DESCRIPTION OF PREFERRED EMBODIMENTS

Figure 1A:
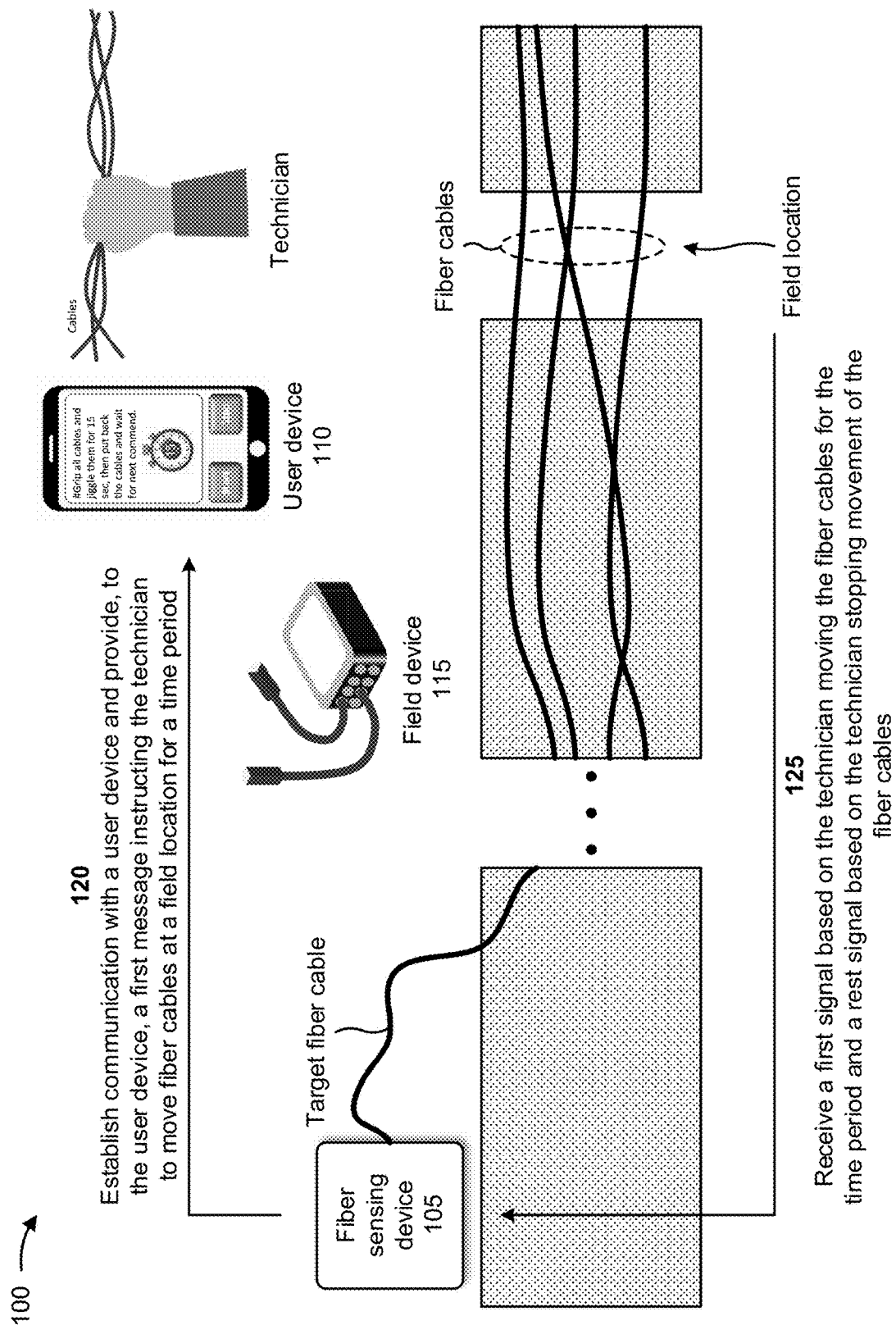
FIGS. 1A-1F are diagrams of one or more example implementations described herein.

The following detailed description of example implementations refers to the accompanying drawings. The same reference numbers in different drawings may identify the same or similar elements.

Typically, there are multiple fiber cables (e.g., telecommunications cables, customer cables, third-party cables, utility cables, and/or the like) traversing a field location, such as within a manhole. Identifying a target fiber cable at the field location is a big challenge since the cables are difficult to distinguish based on visual inspection, because the cables look similar and are usually bound and/or running together at the location. Current techniques for identifying a fiber cable at a field location utilize an invasive approach that is very time consuming and sometimes even dangerous if the technician interacts with an incorrect cable, such as a power cable. Thus, current techniques for identifying a deployed fiber cable at a field location consume computing resources (e.g., processing resources, memory resources, communication resources, and/or the like), networking resources, transportation resources, human resources, and/or the like associated with identifying an incorrect fiber cable, traveling to identify the incorrect fiber cable, accessing the incorrect fiber cable underground at the field location, re-identifying a correct fiber cable, recovering lost network traffic, and/or the like.

Some implementations described herein provide a fiber sensing device that identifies deployed target fiber cables in real-time. For example, the fiber sensing device may establish communication with a user device, and may provide, to the user device, a first message instructing a technician to move fiber cables at a field location for a time period. The fiber sensing device may receive a first signal based on the technician moving the fiber cables for the time period and a rest signal based on the technician stopping movement of the fiber cables, and may calculate a distance to the field location, an average peak signal, and a baseline signal based on the first signal and the rest signal. The fiber sensing device may calculate a data collection window based on the distance, the average peak signal, and the baseline signal, and may provide, to the user device, a second message instructing the technician to move one fiber cable at a time. The fiber sensing device may receive one or more second signals based on the technician moving one fiber cable at a time, and may provide, for display to the user device, the data collection window and indications of the one or more second signals, within the data collection window.

In this way, the fiber sensing device identifies deployed fiber cables in real-time. The fiber sensing device may enable a technician to efficiently identify a target fiber cable at a field location and perform maintenance on the target fiber cable. The fiber sensing device may communicate with a user device and/or a field device operated by the technician to identify the target fiber cable. Characteristic vibration frequencies may be generated by the field device so that the fiber sensing device may easily detect degraded vibration in the target fiber cable. Thus, the fiber sensing device conserves computing resources, networking resources, transportation resources, human resources, and/or the like that would otherwise have been consumed in identifying an incorrect fiber cable, traveling to identify the incorrect fiber cable, accessing the incorrect fiber cable underground at the field location, re-identifying a correct fiber cable, recovering lost network traffic, and/or the like.

FIGS. 1A-1F are diagrams of one or more example implementations 100 described herein. As shown in FIG. 1A, a fiber sensing device 105 may be associated with a user device 110, a field device 115, and a technician operating the user device 110 and/or the field device 115. Further details of the fiber sensing device 105, the user device 110, and the field device 115 are provided elsewhere herein.

As shown in FIG. 1A, multiple fiber cables (e.g., telecommunications cables, customer cables, third-party cables, utility cables, and/or the like) may be provided at a field location (e.g., within a manhole) of a technician. One of the multiple fiber cables corresponds to a target fiber cable connected to the fiber sensing device 105. The technician may utilize the user device 110 and/or the field device 115 to identify the target fiber cable at the field location, rather than utilizing visual inspection. In some implementations, the fiber sensing device 105 may be connected to a fiber port that is connected to the target fiber cable at a central office.

As further shown in FIG. 1A, and by reference number 120, the fiber sensing device 105 may establish communication with the user device 110 and may provide, to the user device 110, a first message instructing the technician to perform an action, such as moving all fiber cables at a field location for a time period. For example, the fiber sensing device 105 may establish a communication channel with the user device 110 via a public or private wireless data network. In some implementations, the user device 110 may include a cable identifier application that the technician executes to establish the communication channel with the fiber sensing device 105. The cable identifier application may include an option to permit the technician to input a coarse location range (e.g., location data) of the field location. This may help the fiber sensing device 105 to determine an exact distance to the field location quickly and without being affected by other noise along the target fiber cable. The cable identifier application may provide a window in which messages, received from the fiber sensing device 105, are displayed to the technician.

After the communication channel is established with the user device 110, the fiber sensing device 105 may generate the first message instructing the technician to move all the fiber cables at the field location for the time period, and may provide the first message to the user device 110. The user device 110 may receive the first message and may display, to the technician, the instructions to move all the fiber cables at the field location for the time period. Based on the first message, the technician may grip and move (e.g., jiggle) all the fiber cables for the time period (e.g., a predetermined quantity of seconds, such as fifteen seconds, twenty seconds, and/or the like) to ensure that the fiber sensing device 105 detects a disturbance at the field location. The technician may release all the fiber cables after the time period expires.

As further shown in FIG. 1A, and by reference number 125, the fiber sensing device 105 may receive a first signal based on the technician moving the fiber cables for the time period and a rest signal based on the technician stopping movement of fiber cables. For example, one of the multiple fiber cables at the field location may generate the first signal (e.g., associated with moving the target fiber cable) due to the technician moving the fiber cables for the time period. The fiber cable generating the first signal may also generate the rest signal (e.g., associated with stopping movement of the target fiber cable) due to the technician stopping movement of the fiber cables after the time period. The fiber cable generating the first signal may provide the first signal and the rest signal to the fiber sensing device 105, and the fiber sensing device 105 may receive the first signal and the rest signal.

Figure 1B:
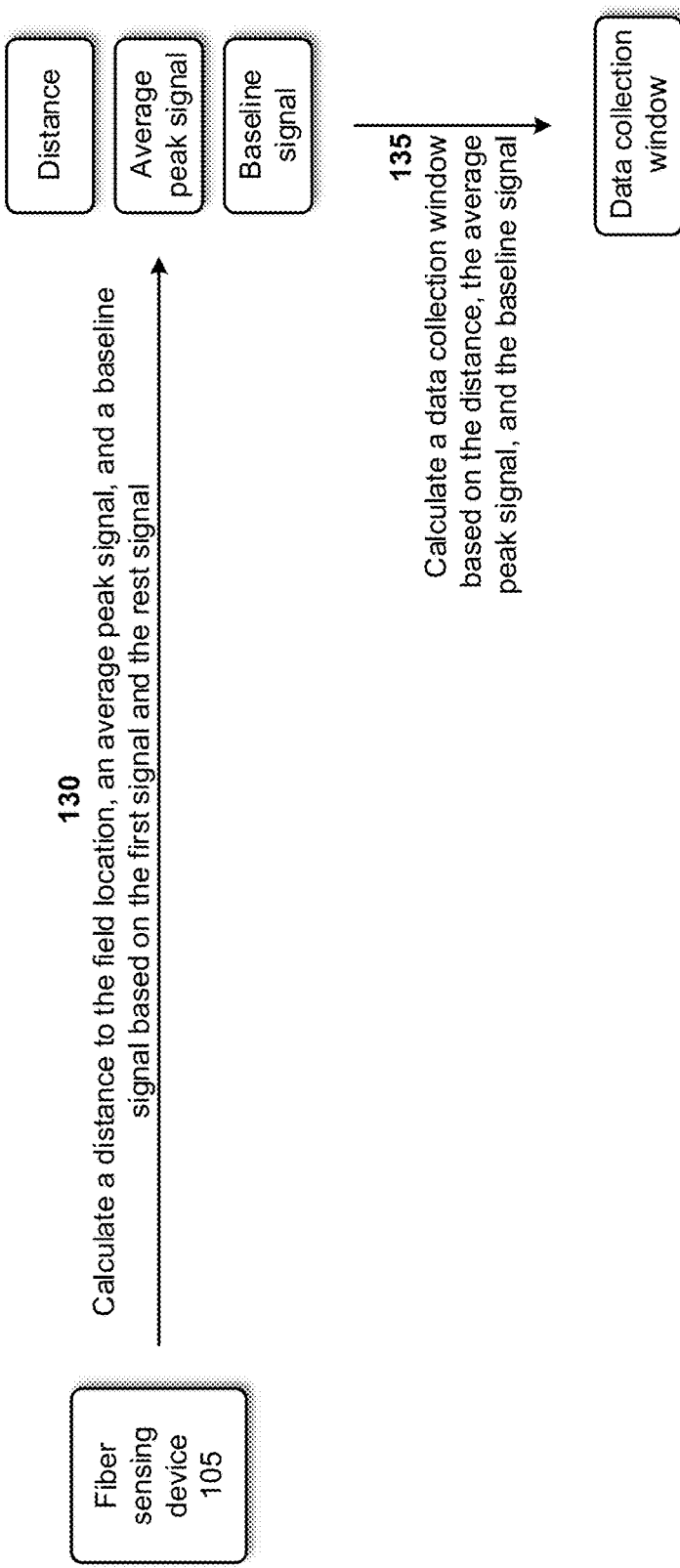

As shown in FIG. 1B, and by reference number 130, the fiber sensing device 105 may calculate a distance to the field location, an average peak signal, and a baseline signal based on the first signal and the rest signal. For example, the fiber sensing device 105 may provide an optical signal (e.g., light) to the target fiber cable, and the optical signal may be reflected back to the fiber sensing device 105 from the field location where the technician is moving the fiber cables for the time period. The fiber sensing device 105 may detect the first signal reflected back from the field location to the fiber sensing device 105 and may determine the distance to the field location (e.g., from a location of the fiber sensing device 105) based on the speed of light and based on the first signal reflected back from the field location to the fiber sensing device 105.

The first signal may include multiple signals received by the fiber sensing device 105 during the time period the technician is moving all the fiber cables. Each of the multiple signals may include a different peak value, and the fiber sensing device 105 may calculate the average peak signal from the different peak values of the multiple signals. The fiber sensing device 105 may calculate the baseline signal based on the rest signal associated with stopping movement of the target fiber cable. The baseline signal may provide an indication of a signal (e.g., a noise level) received by the target fiber cable when the target fiber cable is undisturbed at the field location.

As further shown in FIG. 1B, and by reference number 135, the fiber sensing device 105 may calculate a data collection window based on the distance, the average peak signal, and the baseline signal. In some implementation, the fiber sensing device 105 calculates the data collection window based on the distance to the field location and a predetermined standard deviation (e.g., in meters, such as one meter, two meters, and/or the like). For example, the data collection window may include a range with a lower value of approximately the distance minus the standard deviation and an upper value of approximately the distance plus the standard deviation. In one example, if the standard deviation is two meters, the data collection window may include a four meter window centered on the distance to the field location.

Figure 1C:
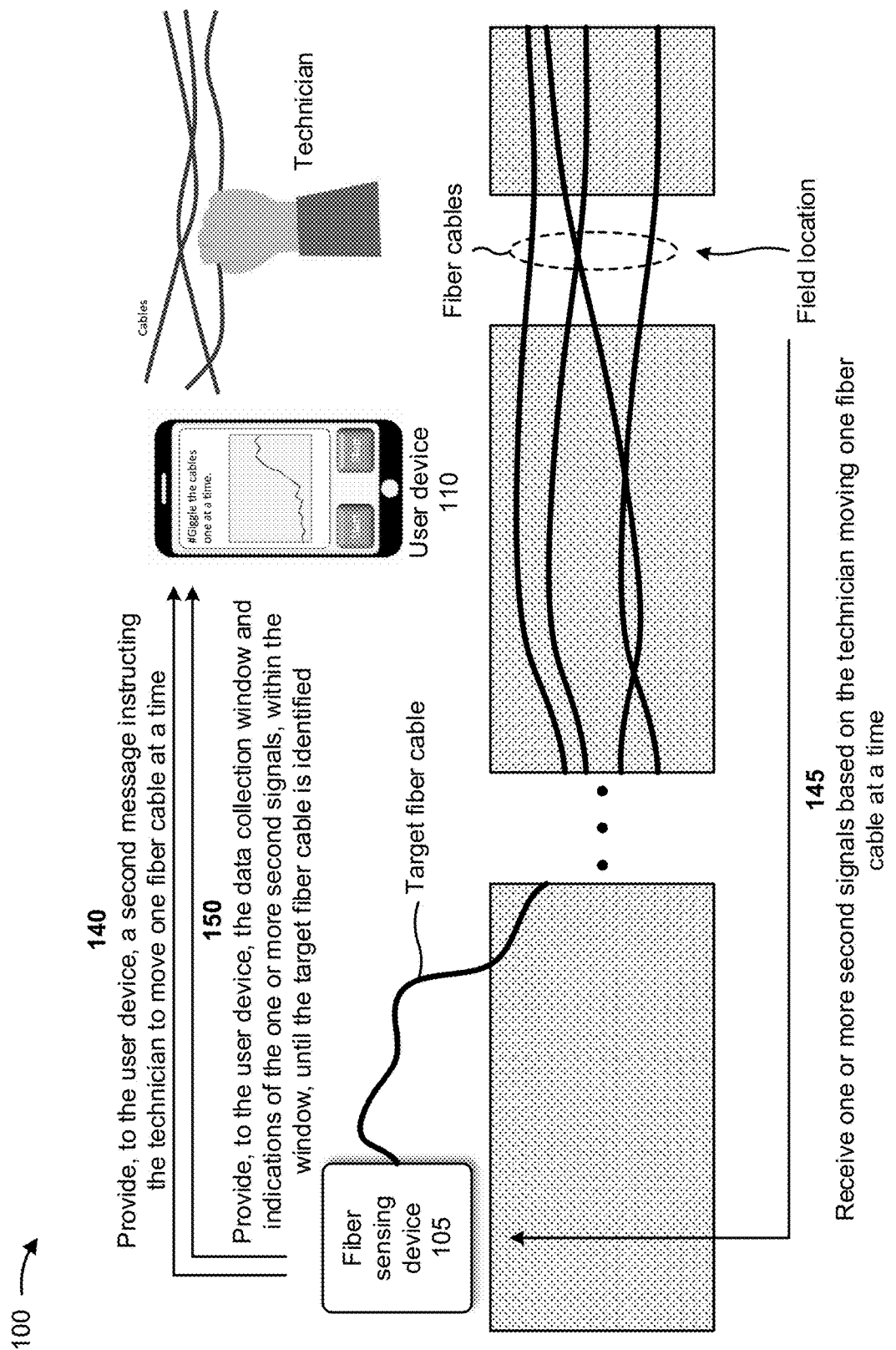

As shown in FIG. 1C, and by reference number 140, the fiber sensing device 105 may provide, to the user device 110, a second message instructing the technician to move one fiber cable at a time. For example, the fiber sensing device 105 may generate the second message instructing the technician to perform an action, such as moving one fiber cable at a time after calculating the data collection window. The fiber sensing device 105 may provide the second message to the user device 110, and the user device 110 may display the second message to the technician or alert the technician in some other form. The technician may move one fiber cable at a time (e.g., while minimizing movement of the other fiber cables) based on the second message.

As further shown in FIG. 1C, and by reference number 145, the fiber sensing device 105 may receive one or more second signals based on the technician moving one fiber cable at a time. For example, one or more of the multiple fiber cables at the field location may generate the one or more second signals (e.g., associated with moving the target fiber cable) due to the technician moving one fiber cable at a time. The one or more fiber cables may provide the one or more second signals to the fiber sensing device 105, and the fiber sensing device 105 may receive the one or more second signals.

As further shown in FIG. 1C, and by reference number 150, the fiber sensing device 105 may provide, for display to the user device 110, the data collection window and indications of the one or more second signals, within the data collection window, until the target fiber cable is identified by the technician. For example, the fiber sensing device 105 may provide the data collection and the indications of the one or more second signals, within the data collection window, to the user device 110, and the user device 110 may display the data collection window and the indications of the one or more second signals to the technician. In some implementations, the cable identifier application may display the data collection window and the indications of the one or more second signals (e.g., signal levels) received from the fiber sensing device 105.

In some implementations, the fiber sensing device 105 may provide only averaged signal levels within the data collection window so that the one or more second signals may be provided in real-time or near real-time to the technician (e.g., relative to movement of the fiber cables one at a time). Since data bandwidth between the fiber sensing device 105 and the user device 110 may be limited, the fiber sensing device 105 may provide only a few values of the one or more second signals per second to the user device 110 so that the values may be displayed immediately to the technician.

The technician may continue to move one fiber cable at a time until the technician identifies the target fiber cable. For example, a received signal level of the target fiber cable may be greater than received signal levels of the other fiber cables moved by the technician. Thus, the user device 110 may display small signal levels while the technician is moving one fiber cable at a time until the technician moves the target fiber cable. The small signal levels may be displayed since the technician is not directly moving the target fiber cable, but rather is moving a fiber cable located near to the target fiber cable. The user device 110 may display a greatest signal level when the technician moves the target fiber cable. Once the target fiber cable is identified, the technician may mark the target fiber cable with information identifying the target fiber cable (e.g., a cable identifier, a cable number, a central office port number, and/or like), and may cease execution of the cable identifier application.

Figure 1D:
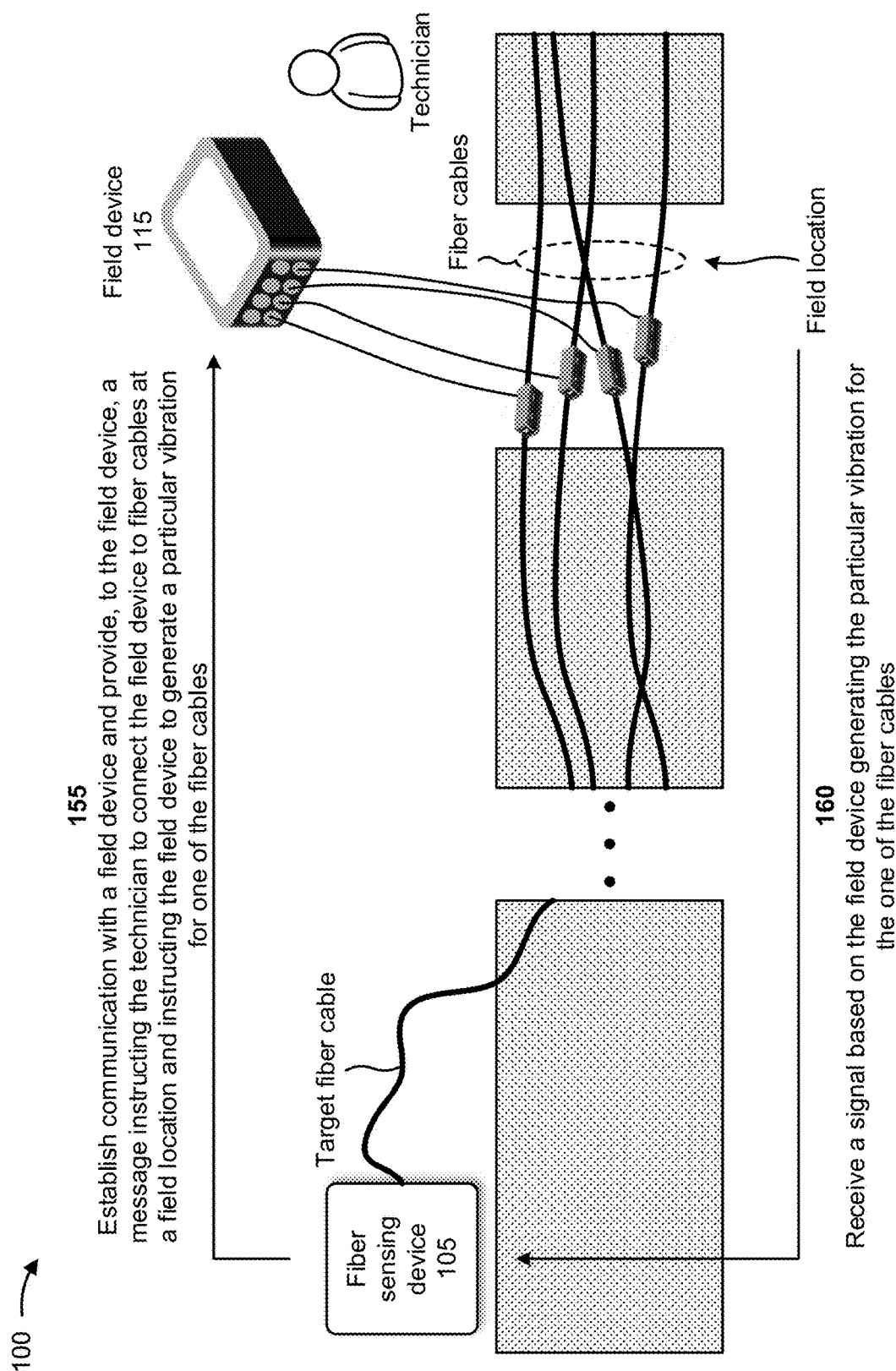

As shown in FIG. 1D, and by reference number 155, the fiber sensing device 105 may establish communication with the field device 115 and may provide, to the field device 115, a message instructing the technician to connect the field device 115 to fiber cables at the field location and instructing the field device 115 to generate a particular vibration for one of the fiber cables. For example, the fiber sensing device 105 may establish a communication channel with the field device 115 via a public or private wireless data network. In some implementations, the field device 115 may include a cable identifier application that the technician executes to establish the communication channel with the fiber sensing device 105. The cable identifier application may provide a window in which messages, received from the fiber sensing device 105, are displayed to the technician. In some implementations, the cable identifier application provides, to the fiber sensing device 105, location data associated with the field location, and the fiber sensing device 105 calculates a distance to the field location based on the location data.

After the communication channel is established with the user device 110, the fiber sensing device 105 may generate the message instructing the technician to connect the field device 115 to the fiber cables at the field location and instructing the field device 115 to generate the particular vibration for one of the fiber cables. The fiber sensing device 105 may provide the message to the field device 115. The field device 115 may receive the message and may display, to the technician, the instructions to connect the field device 115 to the fiber cables at the field location. Based on the message, the technician may connect cable grabbers of the field device 115 (e.g., shown in FIG. 2A) to the fiber cables at the field location. Once the technician connects the field device 115 to the fiber cables, the technician may select a selection mechanism (e.g., a start button), displayed by the cable identifier application, to cause the field device 115 (e.g., one of the cable grabbers) to generate the particular vibration for one of the fiber cables. In some implementations, the particular vibration includes multiple vibration characteristic frequencies generated by the field device 115 (e.g., by one of the cable grabbers), a patterned vibration generated by the field device 115 (e.g., by one of the cable grabbers), and/or the like. The field device 115 may generate the particular vibration for one of the fiber cables for a predetermined time period (e.g., ten seconds, twenty seconds, and/or the like).

As further shown in FIG. 1D, and by reference number 160, the fiber sensing device 105 may receive a signal based on the field device 115 generating the particular vibration for the one of the fiber cables. For example, the fiber sensing device 105 may provide an optical signal (e.g., light) to the target fiber cable, and the optical signal may be reflected back to the fiber sensing device 105 from the field location where the field device 115 is generating the particular vibration for the one of the fiber cables. The fiber sensing device 105 may detect the signal reflected back from the field location to the fiber sensing device 105 based on the field device 115 generating the particular vibration for the target fiber cable. If the target fiber cable is damaged, the fiber sensing device 105 may detect a degraded version of the signal reflected back from the field location.

Figure 1E:
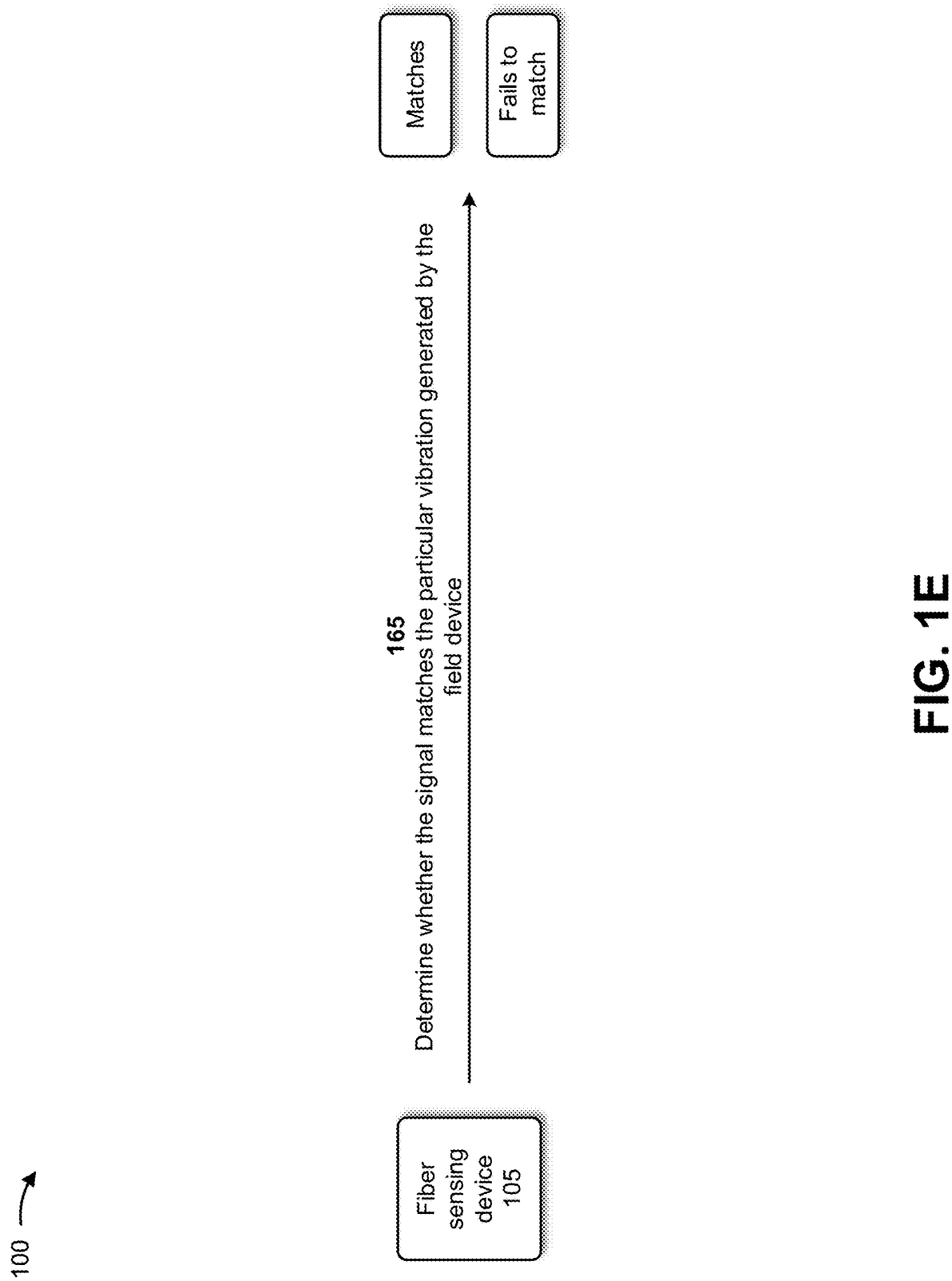

As shown in FIG. 1E, and by reference number 165, the fiber sensing device 105 may determine whether the signal matches the particular vibration generated by the field device 115. For example, the fiber sensing device 105 may compare vibration characteristic frequencies of the particular vibration and vibration characteristic frequencies of the signal. The fiber sensing device 105 may determine that the signal matches the particular vibration generated by the field device 115 when the vibration characteristic frequencies of the particular vibration match the vibration characteristic frequencies of the signal. The fiber sensing device 105 may determine that the signal fails to match the particular vibration generated by the field device 115 when the vibration characteristic frequencies of the particular vibration fail to match the vibration characteristic frequencies of the signal.

Figure 1F:
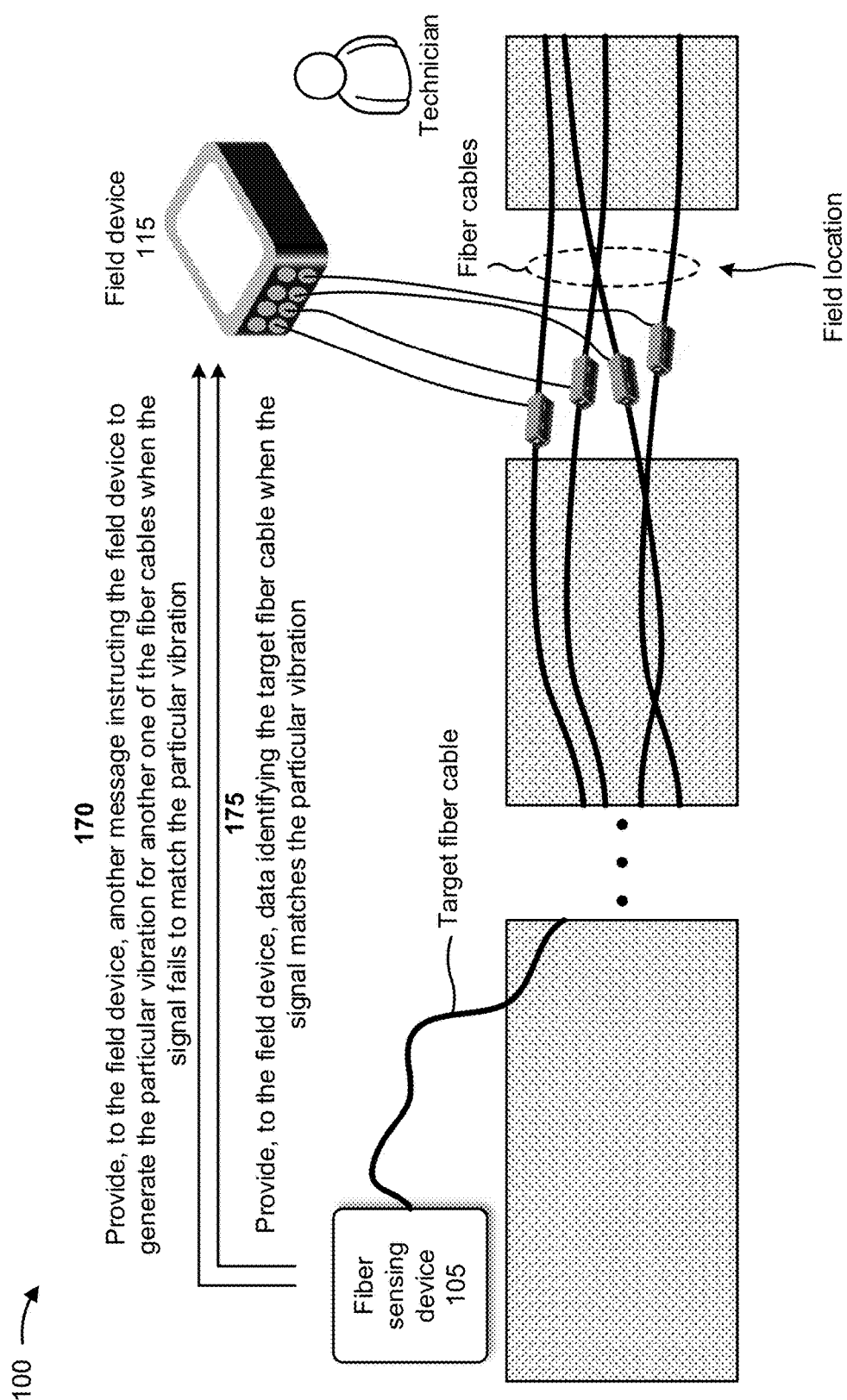

As shown in FIG. 1F, and by reference number 170, the fiber sensing device 105 may provide, to the field device 115, another message instructing the field device 115 to generate the particular vibration for another one of the fiber cables when the signal fails to match the particular vibration. For example, if the signal fails to match the particular vibration, the fiber sensing device 105 may generate the other message instructing the field device 115 to generate the particular vibration for the other one of the fiber cables. The other instruction may cause the field device 115 (e.g., another one of the cable grabbers) to generate the particular vibration for the other one of the fiber cables. In some implementations, the particular vibration includes multiple vibration characteristic frequencies generated by the field device 115 (e.g., by the other one of the cable grabbers), a patterned vibration generated by the field device 115 (e.g., by the other one of the cable grabbers), and/or the like. This process may continue until the fiber sensing device 105 determines that the signal matches the particular vibration for one of the fiber cables.

As further shown in FIG. 1F, and by reference number 175, the fiber sensing device 105 may provide, to the field device 115, data identifying the target fiber cable when the signal matches the particular vibration. For example, when the fiber sensing device 105 determines that the signal matches the particular vibration for one of the fiber cables, the fiber sensing device 105 may determine that the one of the fiber cables (e.g., with the matching signal) is the target fiber cable and may generate the data identifying the target fiber cable. The fiber sensing device 105 may provide the data identifying the target fiber cable to the field device 115, and the field device 115 may display the data identifying the target fiber cable to the technician. Once the target fiber cable is identified, the technician may mark the target fiber cable with the data identifying the target fiber cable (e.g., a cable identifier, a cable number, a central office port number, and/or like), and may cease execution of the cable identifier application. In some implementations, the fiber sensing device 105 may cause the field device 115 to generate an audible alert and/or a visual alert based on the signal matching the particular vibration.

In this way, the fiber sensing device 105 identifies deployed fiber cables in real-time. The fiber sensing device 105 may enable a technician to efficiently identify a target fiber cable at a field location and perform maintenance on the target fiber cable. The fiber sensing device 105 may communicate with the user device 110 and/or the field device 115 operated by the technician to identify the target fiber cable. Characteristic vibration frequencies may be generated by the field device 115 so that the fiber sensing device 105 may easily detect degraded vibration in the target fiber cable. Thus, the fiber sensing device 105 conserves computing resources, networking resources, transportation resources, human resources, and/or the like that would otherwise have been consumed in identifying an incorrect fiber cable, traveling to identify the incorrect fiber cable, accessing the incorrect fiber cable underground at the field location, re-identifying a correct fiber cable, recovering lost network traffic, and/or the like.

As indicated above, FIGS. 1A-1F are provided merely as examples. Other examples may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2A:
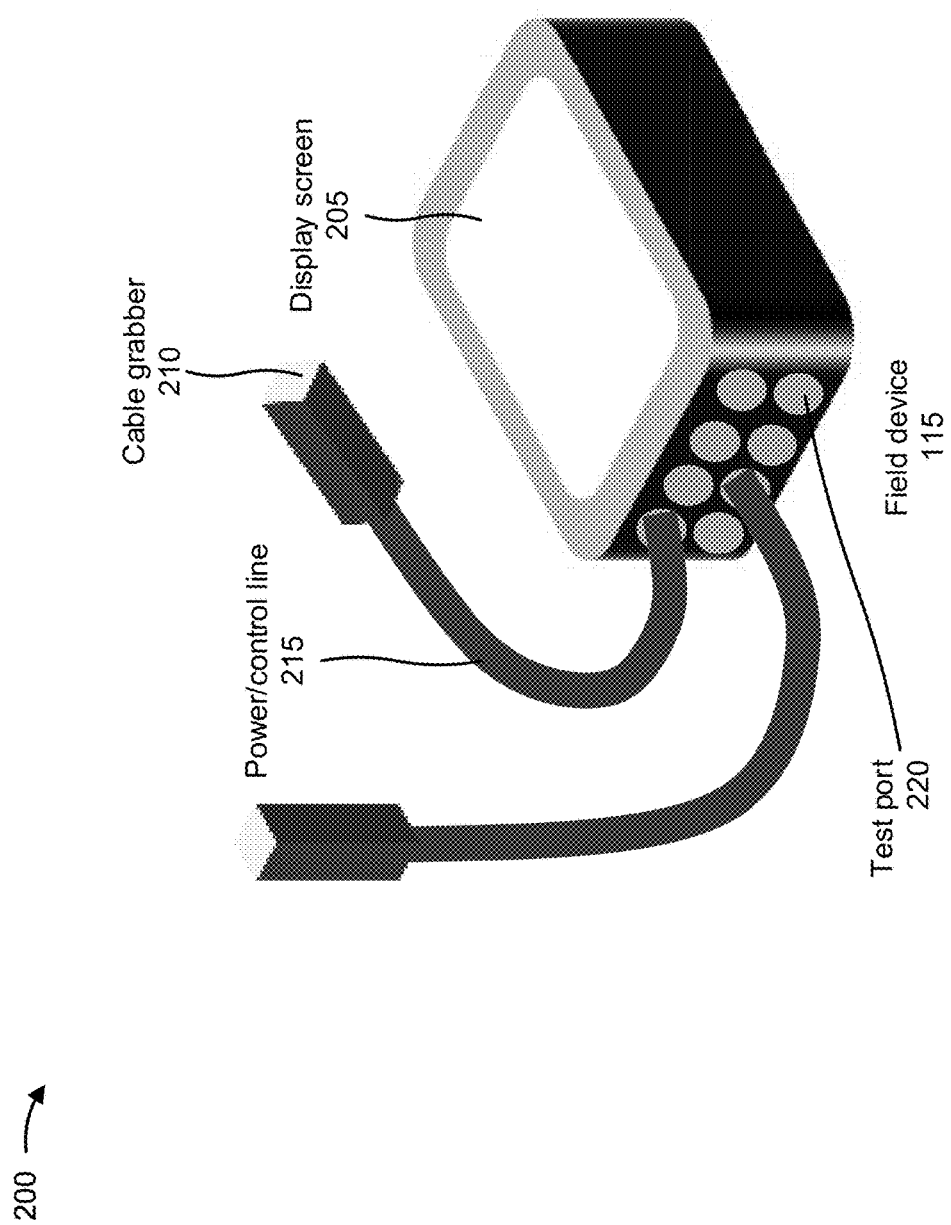
FIGS. 2A-2C are diagrams of one or more example implementations of a field device shown in one or more of FIGS. 1A-1F.
Figure 2B:
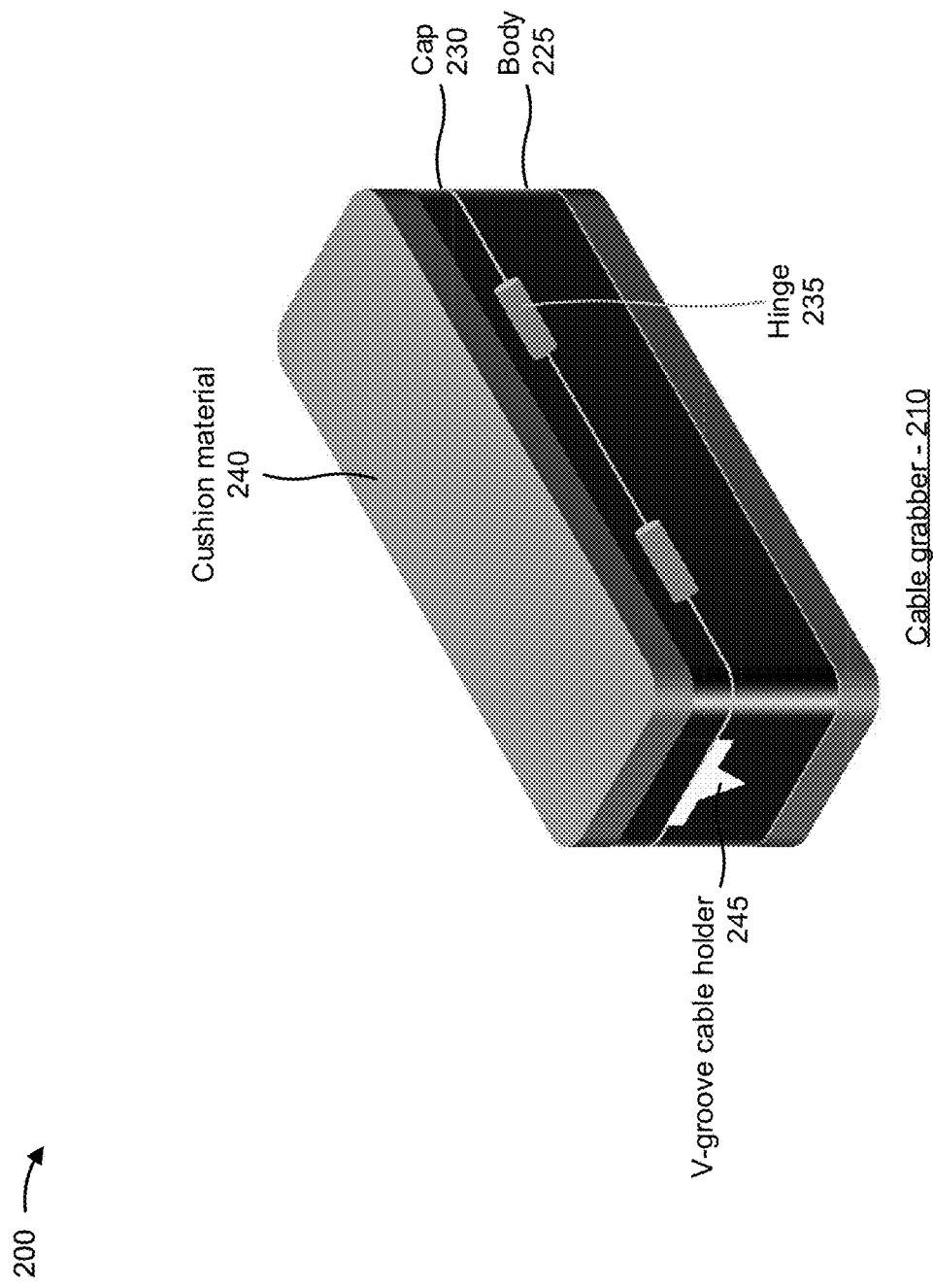
Figure 2C:
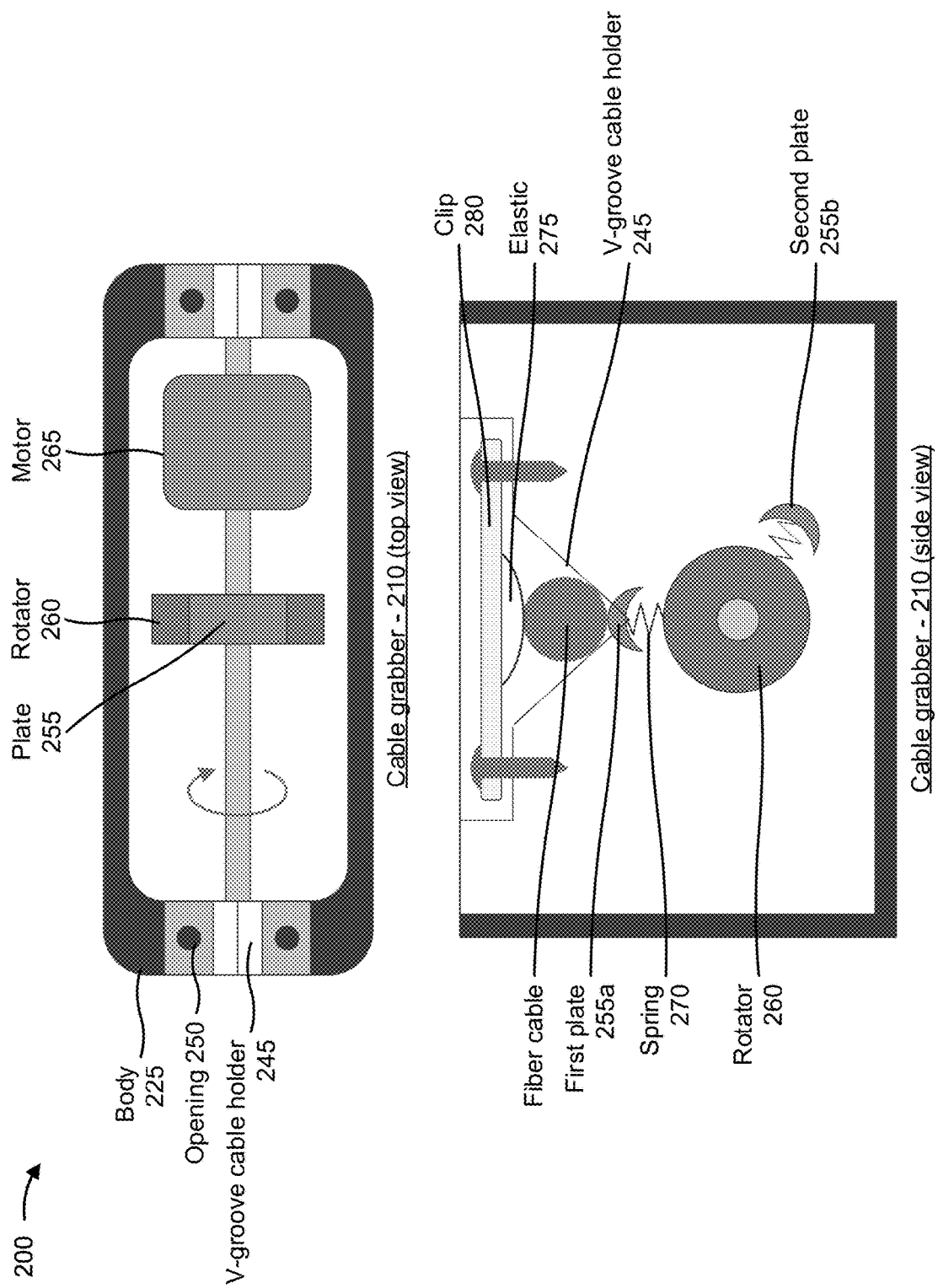

FIGS. 2A-2C are diagrams of one or more example implementations 200 of the field device 115. As shown in FIG. 2A, the field device 115 may include a display screen 205, a cable grabber 210, a power/control line 215, and test ports 220. The display screen 205 may include a touch screen, a display screen, a keyboard, a keypad, and/or the like. In some implementations, the display screen 205 may display output of the cable identifier application, described above.

The cable grabber 210 may include a mechanism that connects the field device 115 and one of the fiber cables at the field location. The cable grabber 210 may be sized and shaped to receive and retain the one of the fiber cables and may provide the particular vibration to the one of the fiber cables. The cable grabber 210 may communicate with the field device 115 via one of the test ports 220 and may receive the instructions to provide the particular vibration to the one of the fiber cables via the one of the test ports 220 or via a wireless protocol. In some implementations, multiple cable grabbers 210 may be provided and connected to the field device 115 via corresponding test ports 220. In some implementations, the cable grabbers 210 may be a separate unit (e.g., multiple cable grabbers 210 bound together) from the field device 115 and may wirelessly communicate with the field device 115. Further details of the cable grabber 210 are provided below in connection with FIGS. 2B and 2C.

The power/control line 215 may include a cable that enables the cable grabber 210 to communicate with the field device 115, via the test port 220. The power/control line 215 may receive, from the field device 115, the instructions to provide the particular vibration to the one of the fiber cables via the one of the test ports 220 and may provide the instructions to the cable grabber 210.

The test port 220 may include a receiver, a transmitter, a transceiver, a modem, a network interface card, and/or the like that enables the field device 115 to communicate with the cable grabber 210 via the power/control line 215.

As shown in FIG. 2B, the cable grabber 210 of the field device 115 may include a body 225, a cap 230, hinges 235, a cushion material 240, and a V-groove cable holder 245. The body 225 and the cap 230 may form a housing for internal components of the cable grabber 210, described below in connection with FIG. 2C. The body 225 and the cap 230 may be sized and shaped to house internal components of the cable grabber 210 and to receive and retain the fiber cable. The body 225 and the cap 230 may interconnect via the hinges 235 so that the fiber cable may be received and retained by cable grabber 210. The body 225 and the cap 230 may be formed from a variety of materials, such as plastic, steel, an alloy, and/or the like. The cushion material 240 may include an elastic material provided on a bottom of the body 225 and on a top of the cap 230. The cushion material 240 may enable the technician to handle and manipulate the cable grabber 210 more easily. The V-groove cable holder 245 may retain the fiber cable in the cable grabber 210 and may be sized and shaped to receive and retain the fiber cable.

As shown in the top view of FIG. 2C, the cable grabber 210 may include the body 225, the V-groove cable holder 245, an opening 250 for clipping the fiber cable, a plate 255, a rotator 260, and a motor 265. The V-groove cable holder 245 may connect to a portion of the body 225 (e.g., on opposing sides of the body 225) and may communicate with the opening 250 to retain the fiber cable within the cable grabber 210. The opening 250 may receive a pin to clip or retain the fiber cable against the V-groove cable holder 245. The plate 255 may connect to the rotator 260 and may rotate with the rotator 260. The plate 255 may be sized, shaped, and oriented to periodically strike a portion of the fiber cable as the plate 255 is rotated by the rotator 260. The rotator 260 may connect to the motor 265 and may be rotated based on rotational movement generated by the motor 265.

As shown in the side view of FIG. 2C, the cable grabber 210 may include the V-groove cable holder 245, two plates 255 (e.g., a first plate 255a and a second plate 255b), springs 270, an elastic material 275, and a clip 280. The first plate 255a and the second plate 255b may be curved and may be connected to different portions of the rotator 260. For example, the second plate 255b may be connected to a portion of the rotator 260 that are one-hundred and twenty degrees (clockwise) from a portion of the rotator 260 connected to the first plate 255a. Each of the first plate 255a and the second plate 255b may connect to the rotator 260 via the spring 270 and may periodically strike a portion of the fiber cable as the first plate 255a and the second plate 255b are rotated by the rotator 260. In one example, if a rotation frequency of the rotator 260 is F, the first plate 255a may generate a vibration characteristic frequency of F1=3F/2, and the second plate 255b may generate a vibration characteristic frequency of F2=3F. The elastic material 275 and the clip 280 may be sized and shaped to receive and retain the fiber cable against the V-groove cable holder 245, without damaging the fiber cable.

The number and arrangement of components shown in FIGS. 2A-2C are provided as an example. The field device 115 and/or the cable grabber 210 may include additional components, fewer components, different components, or differently arranged components than those shown in FIGS. 2A-2C. Additionally, or alternatively, a set of components (e.g., one or more components) of the field device 115 and/or the cable grabber 210 may perform one or more functions described as being performed by another set of components of the field device 115 and/or the cable grabber 210.

Figure 3:
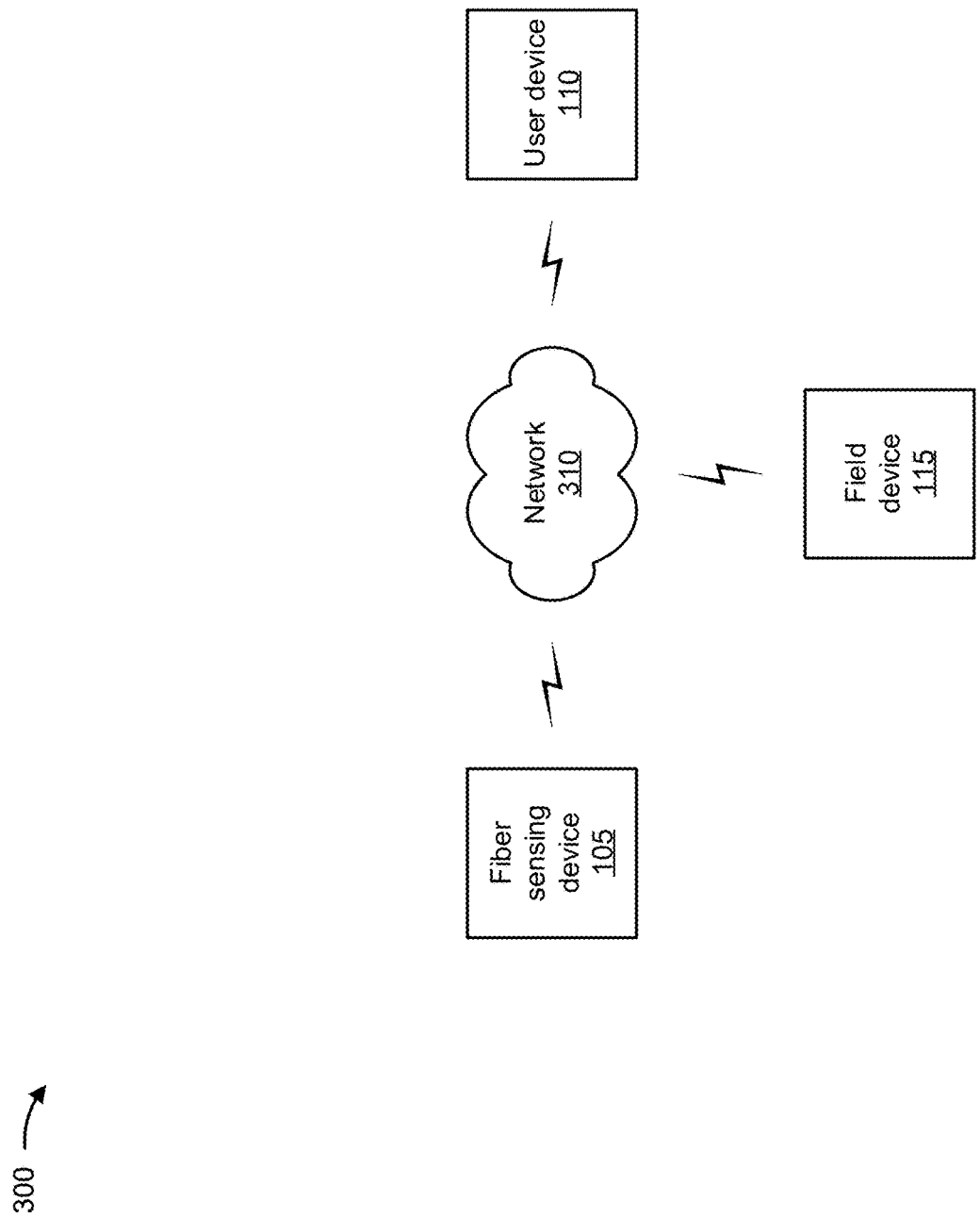
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the fiber sensing device 105, the user device 110, the field device 115, and a network 310. Devices of the environment 300 may interconnect via wired connections, wireless connections, or a combination of wired and wireless connections.

The fiber sensing device 105 includes one or more devices capable of receiving, generating, storing, processing, and/or providing information, such as information described herein. For example, the fiber sensing device 105 may include a distributed acoustic sensing device that uses a fiber cable to provide distributed strain sensing, where the fiber cable is a sensing element and vibration measurements are made using an optoelectronic device. The distributed acoustic sensing device may include a Rayleigh scattering-based distributed acoustic sensing device. The fiber sensing device 105 may also include or be associated with a laptop computer, a tablet computer, a desktop computer, a handheld computer, or a similar type of device that determines vibration measurements and fiber cable distances to detected vibrations. In some implementations, the fiber sensing device 105 may receive information from and/or transmit information to the user device 110 and/or the field device 115.

The user device 110 includes one or more devices capable of receiving, generating, storing, processing, and/or providing information, such as information described herein. For example, the user device 110 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), or a similar type of device.

The field device 115 includes one or more devices capable of receiving, generating, storing, processing, and/or providing information, as described herein. For example, the field device 115 may include a vibration exciter that produces a mechanical motion to a test object (e.g., a fiber cable), and that produces a range of harmonic or time-dependent excitation forces and/or displacements through a range of frequencies. The field device 115 may include a mechanical vibration exciter, an electrodynamic vibration exciter, electrohydraulic vibration exciter, an electromagnetic vibration exciter, and/or the like. The field device 115 may also include or be associated with a laptop computer, a tablet computer, a desktop computer, a handheld computer, or a similar type of device.

The network 310 includes one or more wired and/or wireless networks. For example, the network 310 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
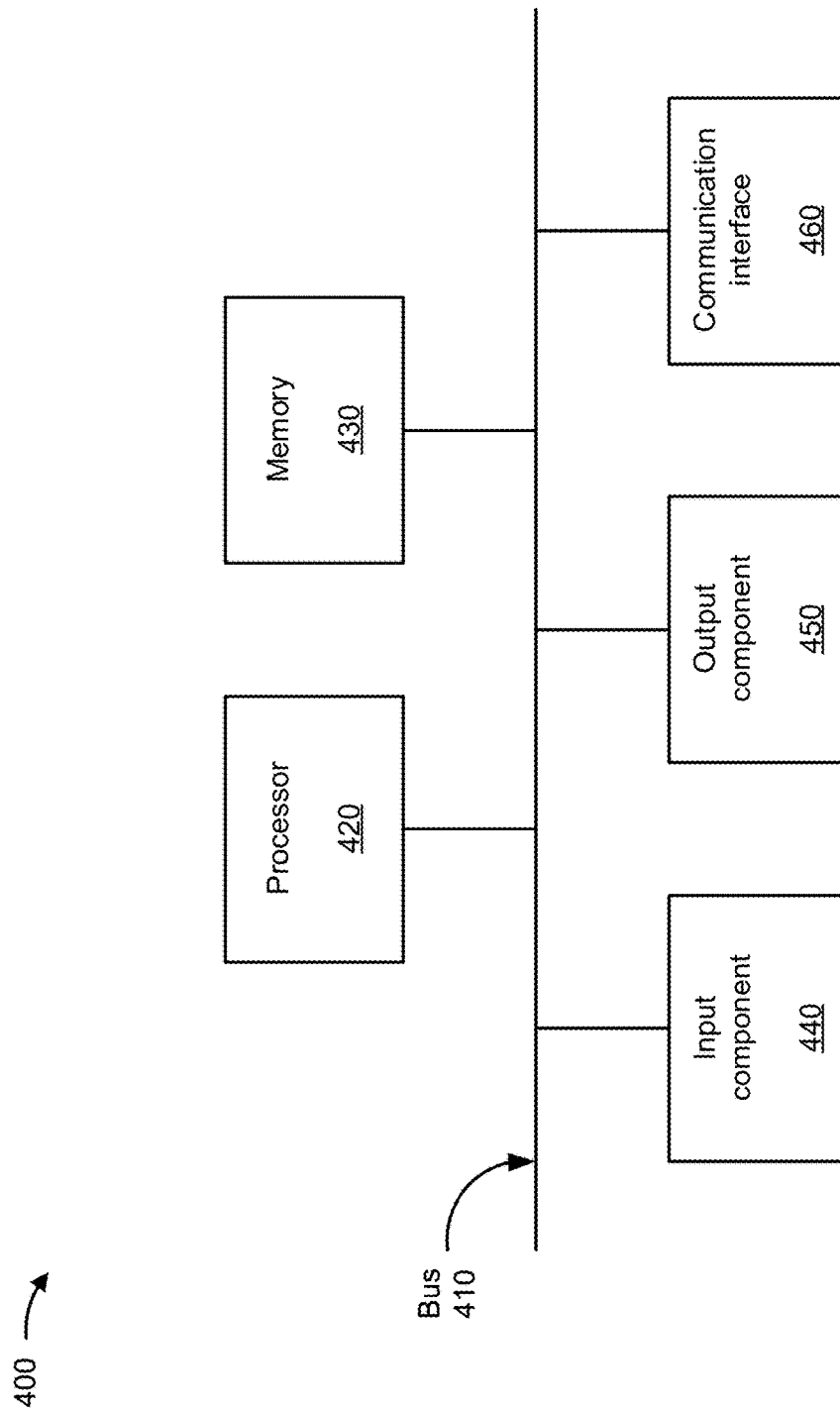
FIG. 4 is a diagram of example components of one or more devices of FIG. 3.

FIG. 4 is a diagram of example components of a device 400, which may correspond to the fiber sensing device 105, the user device 110, and/or the field device 115. In some implementations, the fiber sensing device 105, the user device 110, and/or the field device 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flow chart of an example process 500 for identifying deployed fiber cables in real-time. In some implementations, one or more process blocks of FIG. 5 may be performed by a device (e.g., the fiber sensing device 105). In some implementations, one or more process blocks of FIG. 5 may be performed by another device or a group of devices separate from or including the device, such as a user device (e.g., the user device 110) and/or a field device (e.g., the field device 115). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include establishing communication with a user device (block 510). For example, the device may establish communication with a user device, as described above.

As further shown in FIG. 5, process 500 may include providing, to the user device, a first message instructing a technician to move fiber cables at a field location for a time period (block 520). For example, the device may provide, to the user device, a first message instructing a technician to move fiber cables at a field location for a time period, as described above.

As further shown in FIG. 5, process 500 may include receiving a first signal based on the technician moving the fiber cables for the time period and a rest signal based on the technician stopping movement of the fiber cables (block 530). For example, the device may receive a first signal based on the technician moving the fiber cables for the time period and a rest signal based on the technician stopping movement of the fiber cables, as described above.

As further shown in FIG. 5, process 500 may include calculating a distance to the field location, an average peak signal, and a baseline signal based on the first signal and the rest signal (block 540). For example, the device may calculate a distance to the field location, an average peak signal, and a baseline signal based on the first signal and the rest signal, as described above.

As further shown in FIG. 5, process 500 may include calculating a data collection window based on the distance, the average peak signal, and the baseline signal (block 550). For example, the device may calculate a data collection window based on the distance, the average peak signal, and the baseline signal, as described above. In some implementations, the data collection window is a range that includes a lower value defined by the distance minus a predetermined distance and an upper value defined by the distance plus the predetermined distance.

As further shown in FIG. 5, process 500 may include providing, to the user device, a second message instructing the technician to move one fiber cable at a time (block 560). For example, the device may provide, to the user device, a second message instructing the technician to move one fiber cable at a time, as described above.

As further shown in FIG. 5, process 500 may include receiving one or more second signals based on the techni-cian moving one fiber cable at a time (block 570). For example, the device may receive one or more second signals based on the technician moving one fiber cable at a time, as described above. In some implementations, a target fiber cable is associated with a second signal, of the one or more second signals, with a greatest signal value.

As further shown in FIG. 5, process 500 may include providing, for display to the user device, the data collection window and indications of the one or more second signals, within the data collection window (block 580). For example, the device may provide, for display to the user device, the data collection window and indications of the one or more second signals, within the data collection window, as described above. In some implementations, providing the data collection window and the indications of the one or more second signals, within the data collection window, includes providing the data collection window and the indications of the one or more second signals, within the data collection window, in real-time or near real-time. In some implementations, the indications of the one or more second signals include averaged signal levels received by the device within the data collection window.

In some implementations, process 500 includes receiving, from the user device, location data associated with the field location, wherein the distance to the field location is further calculated based on the location data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    establishing, by a device, communication with a user device;
    receiving, by the device, a first signal based on a technician moving fiber cables at a field location for a predetermined time period and a rest signal based on the technician stopping movement of the fiber cables;
    calculating, by the device, a distance to the field location, an average peak signal, and a baseline signal based on the first signal and the rest signal;
    calculating, by the device, a data collection window based on the distance, the average peak signal, and the baseline signal;
    providing, by the device and to the user device, a message;
    receiving, by the device, one or more second signals based on the technician moving one fiber cable at a time after receiving the message; and
    providing, by the device and for display to the user device, the data collection window and indications of the one or more second signals, within the data collection window.

2. The method of claim 1, further comprising:
    receiving, from the user device, location data associated with the field location,
    wherein the distance to the field location is further calculated based on the location data.

3. The method of claim 1, wherein the data collection window is a range that includes a lower value defined by the distance minus a predetermined distance and an upper value defined by the distance plus the predetermined distance.

4. The method of claim 1, wherein providing the data collection window and the indications of the one or more second signals, within the data collection window, comprises:
    providing the data collection window and the indications of the one or more second signals, within the data collection window, in real-time or near real-time.

5. The method of claim 1, wherein a target fiber cable is associated with a second signal, of the one or more second signals, with a greatest signal value.

6. The method of claim 1, wherein the message instructs the technician to move one fiber cable at a time.

7. The method of claim 1, wherein the indications of the one or more second signals include averaged signal levels received by the device within the data collection window.

8. A device comprising:
    one or more processors configured to:
        establish communication with a field device;
        provide, to the field device, a message instructing a technician to connect the field device to fiber cables at a field location and instructing the field device to generate a particular vibration for one of the fiber cables;
        receive a signal based on the field device generating the particular vibration for the one of the fiber cables;
        determine whether the signal matches the particular vibration generated by the field device;
        provide, to the field device, another message instructing the field device to generate the particular vibration for another one of the fiber cables based on the signal failing to match the particular vibration; and
        provide, to the field device, data identifying a target fiber cable based on the signal matching the particular vibration.

9. The device of claim 8, wherein the one or more processors are further configured to:
    provide, to the field device, instructions to identify a target fiber cable with the data identifying the target fiber cable based on the signal matching the particular vibration.

10. The device of claim 8, wherein the particular vibration includes multiple vibration characteristic frequencies generated by the field device.

11. The device of claim 8, wherein the one or more processors are further configured to:
    receive, from the field device, location data associated with the field location; and
    calculate a distance to the field location based on the location data.

12. The device of claim 8, wherein the one or more processors are further configured to:
    cause the field device to generate an audible or visual alert based on the signal matching the particular vibration.

13. The device of claim 8, wherein the particular vibration includes a patterned vibration generated by the field device.

14. The device of claim 8, wherein the one or more processors, to establish the communication with the field device, are configured to:
    establish a wireless communication with the field device via a wireless network.

15. A non-transitory computer-readable medium storing a set of instructions, the set of instructions comprising:
  one or more instructions that, when executed by one or more processors of a field device, cause the field device to:
    establish communication with a fiber sensing device;
    receive, from the fiber sensing device, a message instructing a technician to connect the field device to fiber cables at a field location and instructing the field device to generate a particular vibration for one of the fiber cables;
    generate the particular vibration for the one of the fiber cables based on the message;
    receive, from the fiber sensing device, another message instructing the field device to generate the particular vibration for another one of the fiber cables based on a signal failing to match the particular vibration; and
    receive, from the fiber sensing device, data identifying a target fiber cable based on the signal matching the particular vibration.

16. The non-transitory computer-readable medium of claim 15, wherein the one or more instructions further cause the field device to:
  receive an additional message from the fiber sensing device; and
  generate the particular vibration for the other one of the fiber cables based on the additional message.

17. The non-transitory computer-readable medium of claim 15, wherein the one or more instructions further cause the field device to:
  receive, from the fiber sensing device, instructions to identify a target fiber cable with the data identifying the target fiber cable based on the signal matching the particular vibration.

18. The non-transitory computer-readable medium of claim 15, wherein the particular vibration includes multiple vibration characteristic frequencies generated by the field device.

19. The non-transitory computer-readable medium of claim 15, wherein the one or more instructions further cause the field device to:
  provide, to the fiber sensing device, location data associated with the field location,
    wherein a distance to the field location is calculated by the fiber sensing device based on the location data.

20. The non-transitory computer-readable medium of claim 15, wherein the one or more instructions further cause the field device to:
  generate an audible or visual alert based on the signal matching the particular vibration.

* * * * *